US010885531B2

(12) United States Patent
Burgin et al.

(10) Patent No.: US 10,885,531 B2
(45) Date of Patent: Jan. 5, 2021

(54) ARTIFICIAL INTELLIGENCE COUNTERFEIT DETECTION

(71) Applicant: ACCENTURE GLOBAL SOLUTIONS LIMITED, Dublin (IE)

(72) Inventors: Edward Philip Burgin, Dublin (IE); Milad Alucozai, Dublin (IE); Laura Alvarez Jubete, Dublin (IE); Gaurav Kaila, Dublin (IE); Victor Oliveira Antonino, Dublin (IE)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 66 days.

(21) Appl. No.: 16/259,712

(22) Filed: Jan. 28, 2019

(65) Prior Publication Data
US 2019/0236614 A1 Aug. 1, 2019

Related U.S. Application Data

(60) Provisional application No. 62/623,408, filed on Jan. 29, 2018.

(51) Int. Cl.
G06K 9/00 (2006.01)
G06Q 30/00 (2012.01)
G06T 3/40 (2006.01)

(52) U.S. Cl.
CPC ..... *G06Q 30/0185* (2013.01); *G06K 9/00577* (2013.01); *G06T 3/4076* (2013.01); *G06K 2009/0059* (2013.01); *G06T 2207/20081* (2013.01)

(58) Field of Classification Search
CPC .......... G06Q 30/0185; G06K 9/00577; G06K 2009/0059; G06T 3/4076; G06T 2207/20081
USPC ........................................................ 382/100
See application file for complete search history.

(56) References Cited

U.S. PATENT DOCUMENTS

| 2019/0065908 | A1* | 2/2019 | Lee ........................ G06K 9/726 |
| 2019/0313963 | A1* | 10/2019 | Hillen .................. G06N 3/0454 |
| 2019/0354744 | A1* | 11/2019 | Chaloux ............. G06F 16/3334 |
| 2019/0392458 | A1* | 12/2019 | Stonehouse .......... G06K 9/6274 |

* cited by examiner

Primary Examiner — Gabriel I Garcia
(74) Attorney, Agent, or Firm — Mannava & Kang, P.C.

(57) ABSTRACT

A counterfeit detection system provides an artificial intelligence (AI) platform that implements a Generative Adversarial Network (GAN) to classify an image as one of a fake or genuine item and integrates a Classification Activation Module (CAM) to refine counterfeit detection. The GAN may include a generator that generates simulated counterfeit images for a discriminator. The discriminator may be trained to identify faked items by learning from the simulated counterfeit images and/or images of actual faked items. The discriminator may implement a deep neural network of convolutional layers that each analyze a region of an image and produce a weighted output that contributes to the classification based on the analyzed region. The CAM may identify the regions and weights relied upon by the discriminator, provide corresponding heatmaps to subject matter experts, receive annotations from the subject matter experts, and use the annotations as feedback to refine the classifier of the discriminator.

23 Claims, 10 Drawing Sheets

Binarise

Flat Field

Gaussian Blur

Original

Dilate

Erode

Edge Finding

700

```
┌─────────────────────────────────────────────┐
│ Obtain known good images of an item and     │
│ identify features of the item               │
│ 701                                         │
└─────────────────────────────────────────────┘
                      │
                      ▼
┌─────────────────────────────────────────────┐
│ Obtain counterfeit images, including images │
│ of a simulated counterfeit item from the    │
│ generator and/or images of an actual        │
│ counterfeit item from a counterfeit image   │
│ repository                                  │
│ 702                                         │
└─────────────────────────────────────────────┘
                      │
                      ▼
┌─────────────────────────────────────────────┐
│ Identify features from the counterfeit      │
│ images                                      │
│ 703                                         │
└─────────────────────────────────────────────┘
                      │
                      ▼
┌─────────────────────────────────────────────┐
│ Compare features of the counterfeit images  │
│ with the features identified from the known │
│ good images of the item                     │
│ 704                                         │
└─────────────────────────────────────────────┘
                      │
                      ▼
┌─────────────────────────────────────────────┐
│ Retrain the discriminator based on the      │
│ comparisons                                 │
│ 705                                         │
└─────────────────────────────────────────────┘
```

FIG. 7

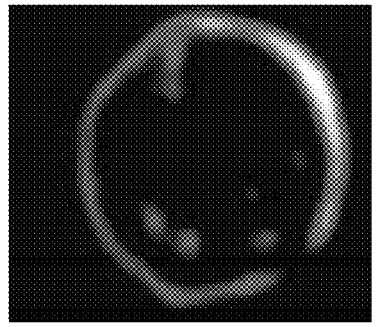 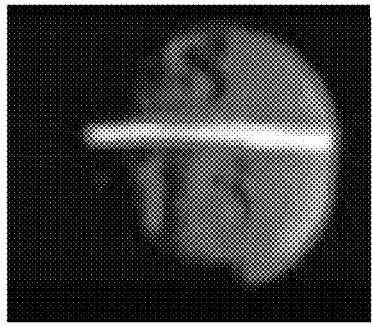 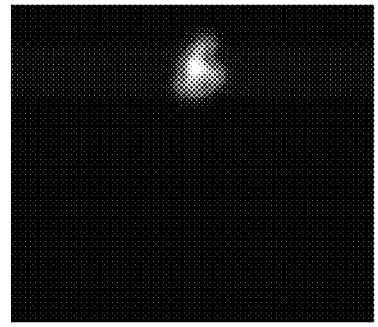
FIG. 9A        FIG. 9B        FIG. 9C
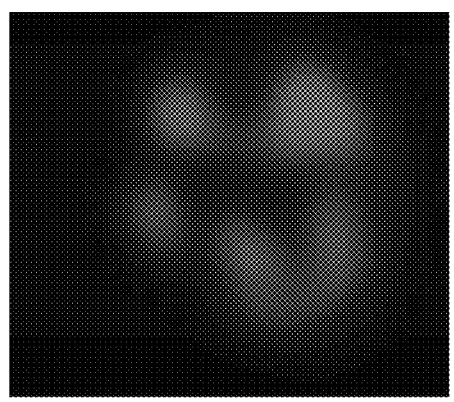
FIG. 10

ARTIFICIAL INTELLIGENCE COUNTERFEIT DETECTION

RELATED APPLICATIONS

This application is a conversion of and claims priority to U.S. Provisional Patent Application No. 62/623,408, entitled "Artificial Intelligence Counterfeit Detection", filed on Jan. 29, 2018, the contents of which is incorporated by reference in its entirety herein.

BACKGROUND

The presence of counterfeit products in a market can negatively impact the value of authentic products. For customers desiring to purchase authentic products, the presence of counterfeit products can deter such customers from purchasing products that may in fact be authentic. While measures, such as limiting retailers that may sell a product, can be taken to guarantee authenticity of a product, such measures can be bypassed or prove to be ineffective for certain products. Such measures can also prove to be ineffective for customers who may question the authenticity of a retailer. For example, poor-quality, fake, and counterfeit medicines are growing and becoming more and more of a threat to public health as they increasingly contaminate the drug supply systems. 10% of medicines worldwide are falsified; 30% in some countries, and a staggering 70% of all drugs in the supply chain in some countries.

The broader counterfeit industry remains an ever-growing problem, given the increased sophistication of manufacturers globally to rapidly generate believable counterfeits with modern manufacturing techniques. Advanced and complicated global supply chains also aid in the distribution of counterfeit goods. Moreover, the items which can be counterfeited are vast, increasing the complexity of detecting a fraudulent item.

BRIEF DESCRIPTION OF DRAWINGS

Embodiments and examples are described in detail in the following description with reference to the following figures. The embodiments are illustrated by examples shown in the accompanying figures in which like reference numerals indicate similar elements.

FIG. 7 illustrates a method of training a discriminator with simulated and/or actual counterfeit images, according to an embodiment;

FIGS. 9A-9C illustrate example heatmaps that highlight regions of an item that are deemed to be important for identifying counterfeits of the item, according to an embodiment; and FIG. 10 illustrates an example heatmap that highlight regions of an item do not with correlate with a genuine item, according to an embodiment.

DETAILED DESCRIPTION

Figure 1:
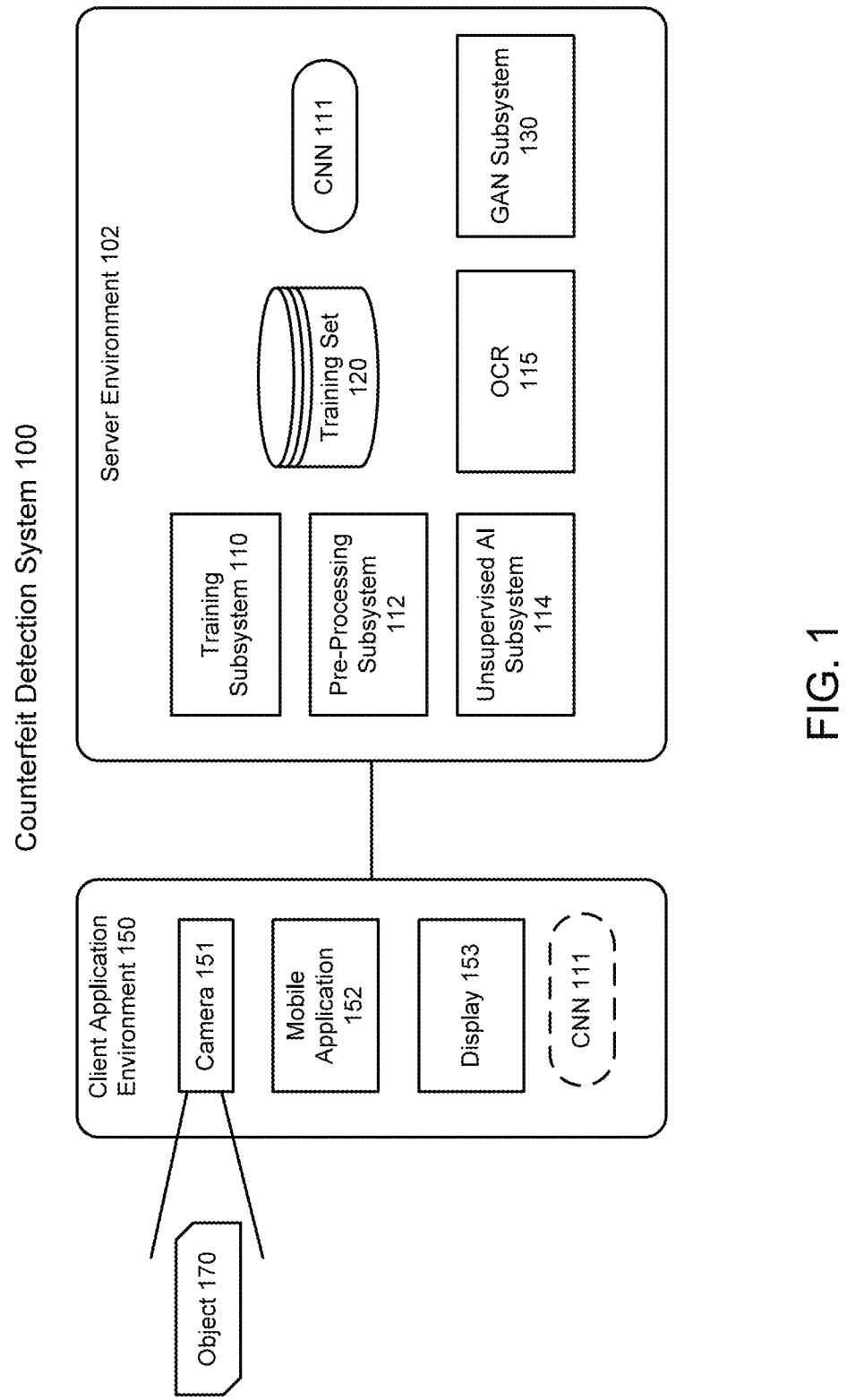
FIG. 1 illustrates a counterfeit detection system, according to an embodiment.

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the examples. Furthermore, the examples may be used together in various combinations.

According to an embodiment of the present disclosure, a counterfeit detection system employs artificial intelligence (AI) techniques to detect fake or counterfeit goods (the terms "fake" and "counterfeit" will be used interchangeably throughout). The system may use Deep Convolutional Generative Adversarial (DCGANs) to create training data for a Convolutional Neural Network (CNN) to help improve accuracy through bootstrapping the training data of the CNN. This may be useful when training data for the CNN is insufficient or unavailable.

In particular, the system may implement a Generative Adversarial Network (GAN) to detect counterfeit goods such as medicinal pills and other medicinal products. The system may use these AI techniques to detect other types of counterfeit goods as well.

The GAN implemented by the system may include a generator, a discriminator, a Class Activation Module (CAM) that implements class activation mapping, and/or other components. The outputs of the generator and the discriminator may be used to iteratively train one another in an "adversarial" manner. For instance, the generator may generate images that simulate a counterfeit item. The images generated by the generator will also be referred to as "simulated counterfeit images" for convenience. The goal of the generator is to generate images that the discriminator classifies as an image of a genuine item. Images of a genuine item will also be referred to as "genuine images" for convenience. The goal of the discriminator is to correctly classify the simulated counterfeit images from the generator.

For instance, outputs of the generator may train the discriminator to identify differences between genuine images and the simulated counterfeit images. These differences may inform the generator of regions (such as pixels or other aspects) of images that correlate with counterfeits. In other words, the differences may train the discriminator to look for particular regions of an image of the item that indicate the item is faked. It should be noted that each region of an image may relate to a specific feature of an item in the image. For instance, a specific region may include a set of pixels that correspond to a feature such as a curvature of a pill in an image being analysed to determine whether the pill in the image is a fake.

Outputs of the discriminator may be used to train the generator to generate more convincing simulated counterfeit images. For instance, the discriminator may provide an indication of the regions of the simulated counterfeit images that it relied upon to correctly classify the simulated counterfeit images. In this way, the generator may be trained based on outputs of the generator. In some instances, the generator may take as input parameters from human users that direct the generator to make certain changes to a genuine image to create a simulated counterfeit image. For instance, the parameter may specify that a font recognized on a genuine image of a pill be adjusted to create a simulated counterfeit image of the pill.

In some examples, the discriminator may alternatively or additionally be trained based on images of actual faked items, which will also be referred to as "actual counterfeit images" for convenience. In these examples, the discriminator may be trained to identify differences between the actual counterfeit images and genuine images. Such learned differences may be provided to the generator as well (even though the generator did not generate the actual counterfeit images).

The discriminator may be implemented as a CNN that uses convolutional layers that each analyses a different region of an image being classified by the generator. It should be noted that "regions of an image" corresponds to an actual region of an item being imaged in the image. The output of one convolutional layer may be provide as input to another convolutional layer until an output convolutional layer is reached. For example, a first convolutional layer may analyse a first region (such as pixel or pixels or other aspect) of the image. The first convolution layer may generate a first convolutional layer output that represents its prediction of whether or not the image is that of a faked item. The first output may be weighted based on a first weight used by the first convolutional layer. The first weight may represent a level of importance of the first region in generating the first convolutional layer output. A second convolutional layer may analyse a different region of the image and similarly generate a second convolutional layer output. In some instances, the input to the second convolutional layer may include the first convolutional layer output. Each convolutional layer output may therefore represent a probability that a respective region of the image indicates that the image is one of a faked item. Each output may be weighted to indicate its relative importance in determining whether the image is one of a faked item. For example, a first region analysed by the first convolutional layer may have a higher correlation with predicting whether an image is one of a faked item than a second region analysed by the second convolutional layer. As such, the first convolutional layer output may have been weighted to reflect the higher correlation. For example, the first weight may be higher (or otherwise have a value that impacts the overall classification of the discriminator more) than the second weight.

The system may implement additional technical improvements to its counterfeit detection capabilities. For instance, the system may implement a CAM that identifies regions of an image that led to the discriminator's classification of whether the image is one of a faked or genuine item. Put another way, the CAM may identify the reasons why the discriminator classified an image as a counterfeit or genuine image. To do so, the CAM may analyze the convolutional layer outputs of the discriminator to identify the regions of the image and corresponding weights. The CAM may generate a graphical interface that represents the regions and corresponding weights. For example, the graphical interface may include a heatmap image that indicates a region and corresponding weight. A heatmap may therefore indicate a region of an image and its relative importance in contributing to the classification.

The heatmap may be presented to a subject matter expert (SME). The SME may include a human user that has expertise in identifying faked items. Thus, the system may provide the heatmap to SMEs to refine the classification, which is provided as feedback to the discriminator. Thus, the expertise of the SME may further train the discriminator, which in turn further trains the generator. To refine the classification and further train the discriminator, the system may receive annotations from the SME. The annotations may indicate an SME's assessment of whether the discriminator used appropriate regions, weights, or otherwise made proper decisions in classifying an image. For instance, the annotation may include a binary (yes/no) assessment, a new or revised weight, a new region, and/or other assessment.

The binary assessment may be use to adjust weights applied by the discriminator for regions. For instance, an SME may provide a "no" indication that a region and/or weight was properly used by the discriminator. If so, the discriminator, based on the annotation, may reduce the weight or otherwise adjust the weight so that the corresponding region is no longer or less relied upon in making the classification. On the other hand, if the SME provided a "yes" indication, then the use of the weight and/or region may be confirmed.

The new or adjusted weight may be input by the SME to revise the weight used by the discriminator for a particular region. For instance, the SME may believe that a region should have had more importance in making the classification and may therefore provide an annotation that the weight should be adjusted higher or otherwise that the corresponding region should contribute more to the overall classification. Likewise, the annotation may indicate that the weight should be adjusted lower or otherwise that the corresponding region should contribute less to the overall classification.

The new region may indicate that a region that was not considered at all by the discriminator should be used. In this example, the system may receive an identification of a region, such as an identification of pixels, that should be used to classify the item in an image. The annotation may include a weight input by the SME or assigned by the system.

The system may use advanced convolutional neural network (CNN) models tuned to first detect a counterfeit good and unique preprocessing used to perform fake classification. Various techniques, such as material texture, pattern recognition, precise object geometry, and object feature position, may be utilized by the system. In an example, the system may identify fake goods, such as fake medicine products using supervised learning. The system receives images of genuine medicine products. The system receives images of fake medicine products from a website. The system includes a pre-processing stage for pre-processing the received images. The system detects fake medicine products using image classification. The system learns the classes (e.g., Genuine and Fake/Falsified/Counterfeit) of the received images.

The system may use a combination of supervised and unsupervised AI techniques for counterfeit detection and classification. For the supervised component, a combination of optical character recognition (OCR) and deep learning for determining features of an item, such as distance of text from a boarder of packaging, etc., may be used. For example, the supervised counterfeit detection may be performed using a database containing item information such as description and unique identifier information. This is linked to photographs and text examples and explanations of counterfeiting of that item. Deep learning models are trained on differences between counterfeit and genuine products between images of genuine and known counterfeits of the item. The trained models, which may include CNNs, may be applied to images and information determined through OCR of the goods to detect counterfeits.

The unsupervised component can include sentiment analysis and social media analysis. If there are many intermediaries, this could be a warning sign giving a high probability of fraud. Many people talking about the item being fake can be identified as a risk factor. The sentiment analysis and social media analysis can utilize a repository either maintained by the application or sourced from the Internet. Also, the unsupervised counterfeit detection may be performed through text analysis extracted from object images through OCR, and the text may then be checked for grammatical correctness and spelling. This would then influence an AI classifier to provide a probability that indicates whether the item is counterfeit or genuine. Also, statistical models based on geography, shipping route, and frequency of fraud for an item can also generate a probability of fraud and feed into classification and probability determination techniques. Also, shipping route information such as start of item journey and intermediaries may also be used.

For supervised learning, the system may perform pre-processing on training data to enhance material features, such as object granularity and texture, to aid in distinguishing highly similar objects. This can facilitate picking up depth of features, smoothness, contrast, edges, and contours. This is achieved through, but not limited to, mathematical morphological operations such as levelling, dilation, erosion, opening, closing, smoothing, etc. Mathematical morphology is a mathematical theory of image processing which facilitates the quantitative analysis and description of geometric structures of an image. Mathematical morphology may include nonlinear image transformations such as erosion, dilation, opening, closing, levelling and watershed transformations. For example, using operations performed by the pre-processing, small objects can be removed from the foreground (usually taken as the bright pixels) of an image, placing them in the background. In addition, small holes in the foreground can be removed, changing small islands of backgrounds into foreground. These techniques can also be used to find specific shapes in an image. They can be used to find areas into which a specific structuring element can fit (edges, corners, . . . ) or to remove small objects and noise.

FIG. 1 illustrates a counterfeit detection system 100, according to an embodiment. The system 100 may include one or more computer platforms. The computer platforms include computer hardware, such as processors, memory, storage devices, network interfaces, etc. The computer platforms may include computers that can run a mobile application, such as smartphones, tablets, personal computers, etc., and servers or other types of computer systems. The computer platforms may include processors to execute machine readable instructions stored on a non-transitory computer readable medium to perform their operations.

According to an embodiment, the system 100 may generally include a server environment 102 and a client application environment 150. These environments may be combined into an autonomous system, or disposed separately as shown, for example, for facilitating remote operation and reducing storage and processing requirements of the client application environment 150. The server environment 102 may include one or more servers, which may have databases, and which may be hosted in a cloud. The client application environment 150 may include a mobile device, such as, for example, a personal digital assistant (PDA), a smart phone, a tablet or a remote personal computer (PC). Certain operations are described as performed on a particular one of the environments, however, one or more of the operations may be performed on the other environment.

The server environment 102 may include a training subsystem 110 for generating one or more CNNs 111 or other supervised AI models. The training subsystem 110 may perform supervised learning to generate the CNN 111 based on one or more training sets, such as training set 120. For example, the CNN 111 is trained to perform image classification based on large image datasets. The CNN 111 may be quantized and optimized for mobile deployment on the client application environment 150 (e.g., shown as the dashed CNN 111 hosted in the client environment 150) or may be hosted on the server environment 102.

In an example, supervised learning is done through a database maintained containing item information such as description and unique identifier information. This is linked to photographs and text examples and explanations of counterfeiting of that item. This is in addition to images and text descriptions of the genuine item. The CNN 111 is trained on differences between counterfeit and genuine products between images of genuine and known counterfeits of the item. Where for example the item is a pharmaceutical pill, OCR may be performed (e.g., OCR 115) to validate the text. The CNN 111 may be trained to specifically detect errors in the font, the depth of the font engraving into the pill, etc. Other features for the deep learning may include the precise curvature of the pill, the ratio of the text size and position to the pill, the fidelity of the font, and the calibrated color. In addition, the CNN 111 might be trained on the texture of the item such as smoothness or homogeneity of the pill. The CNN 111 may perform both automated feature extraction and can be primed to focus on key object features for counterfeiting discrimination.

Pre-processing subsystem 112 may perform steps that are applied to the training set 120 to enhance material features such as object granularity and texture to aid in distinguishing highly similar objects. This can facilitate picking up depth of features, smoothness, contrast, edges, and contours. This is achieved through, but not limited to, mathematical morphological operations such as levelling, dilation, erosion, opening, closing, smoothing, etc.

The unsupervised AI subsystem 114 may perform text analysis using text extracted from object images through OCR, and the text may then be checked for grammatical correctness and spelling. This would then influence a classifier to provide a probability that indicates whether the item is counterfeit or genuine. Statistical models based on geography, shipping route, and frequency of fraud for that item can also generate a probability of fraud and feed into the terminal classification and probability. Shipping route information such as start of item journey and intermediaries may also be used.

Figure 5:
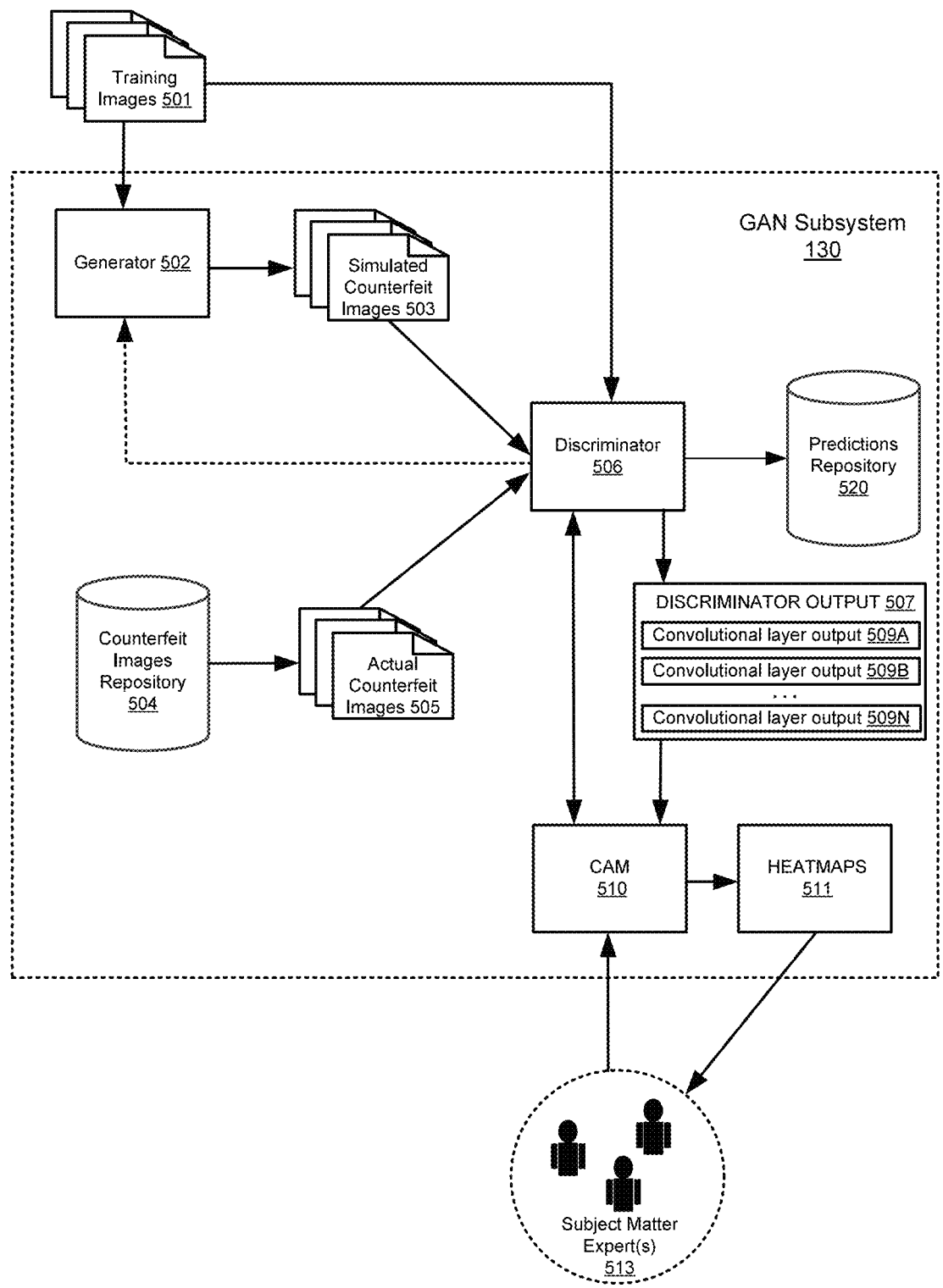
FIG. 5 illustrates a GAN subsystem, according to an embodiment.

The Generative Adversarial Network (GAN) subsystem 130, discussed in more detail with respect to FIG. 5, may include a generator that generates simulated counterfeit images and a discriminator that trains on these and/or images of actual fake items to classify input images as those of faked or genuine items. The classification may be based on deep neural classification techniques that employ a convolutional neural network of convolutional layers to make the classification. Each convolutional layer output may reflect a weighted output that is based on a relative importance of a decision from each convolutional layer. The GAN subsystem 130 may further integrate an explainable AI feature in which the reasons for the classification may be interrogated by a classification activation module and used to solicit feedback from subject matter experts. The feedback may indicate whether or not various weighted decisions were appropriate. The GAN subsystem 130 may retrain the discriminator and/or the CAM based on the annotation. For example, a weight applied by a convolutional layer may be adjusted based on the annotation. In another example, the way in which the CAM displays the heatmaps and/or obtains data for the heatmaps may be retrained based on the annotation.

FIG. 1 also shows the client application environment 150. For example, the client application environment 150 may include a mobile application 152 that can detect counterfeit goods. The client application environment 150 may include a camera 151 to capture an image of an object 170 to determine whether the object 170 is counterfeit. The mobile application 152 may be launched to facilitate taking a picture of the object 170. Through the supervised and unsupervised AI components of the system 100, a determination is made as to whether the object 170 is counterfeit and results may be displayed on the display 153.

The system 100 is capable of assessing the likelihood of an item being a counterfeit based on both supervised and un-supervised methods. Also, the supervised methods may be enhanced by pre-processing training data. Examples of the pre-processing are discussed below.

Figure 2:
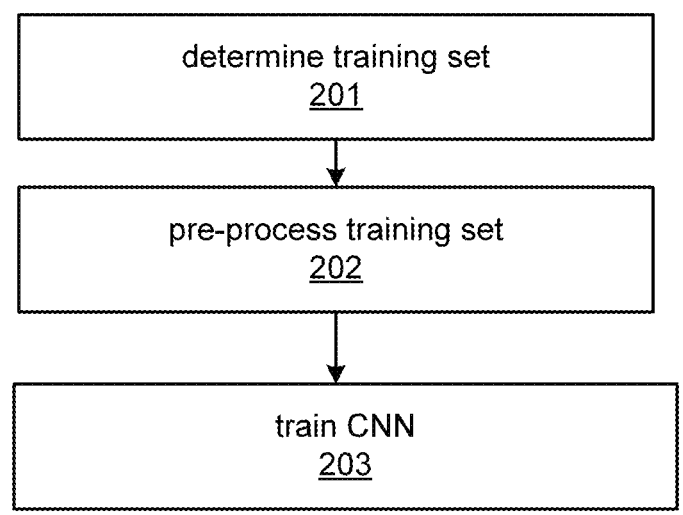
FIGS. 2 and 4 illustrates methods, according to embodiments.
Figure 3D:
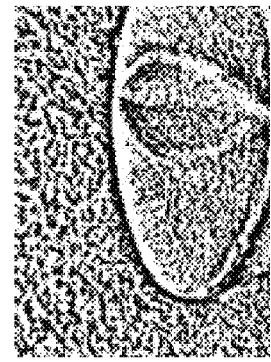
FIGS. 3A-G illustrate examples of pre-processing images, according to an embodiment.
Figure 3C:
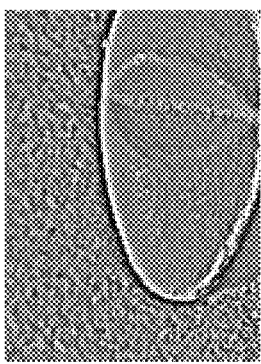
Figure 3B:
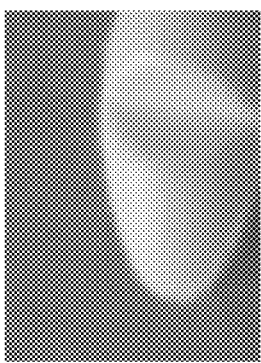
Figure 3A:
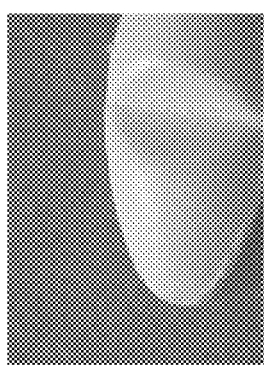
Figure 3G:
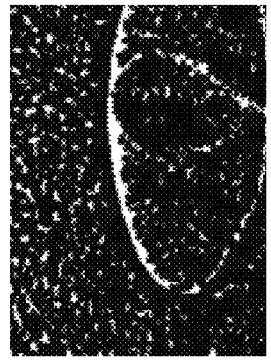
Figure 3F:
Figure 3E:
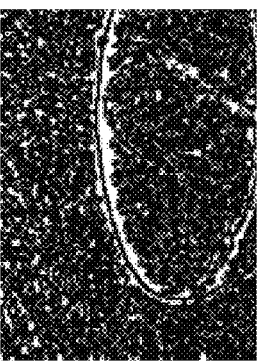

FIG. 2 shows an example of a method for generating the CNN 111. At 201, a training set, such as the training set 120, is determined. The training set 120 may include an image database with labels for images to support supervised machine learning. At 202, the training set 120 is processed by the pre-processing system 112. For example, texture anti-counterfeiting techniques use the change of thickness and color to differentiate a fake from a genuine. Mathematical morphology may be used for the pre-processing. FIGS. 3A-G show a series of images of the pre-processing to emphasize texture and morphology difference. Pre-processing techniques resulting in the example images shown in FIGS. 3A-G may highlight image properties that are not otherwise visible in the original image such as edge, contour, texture, and/or other features that may improve accuracy of the machine learning model. At 203, the CNN 111 is trained to identify counterfeit goods based on the pre-processed training set.

Figure 4:
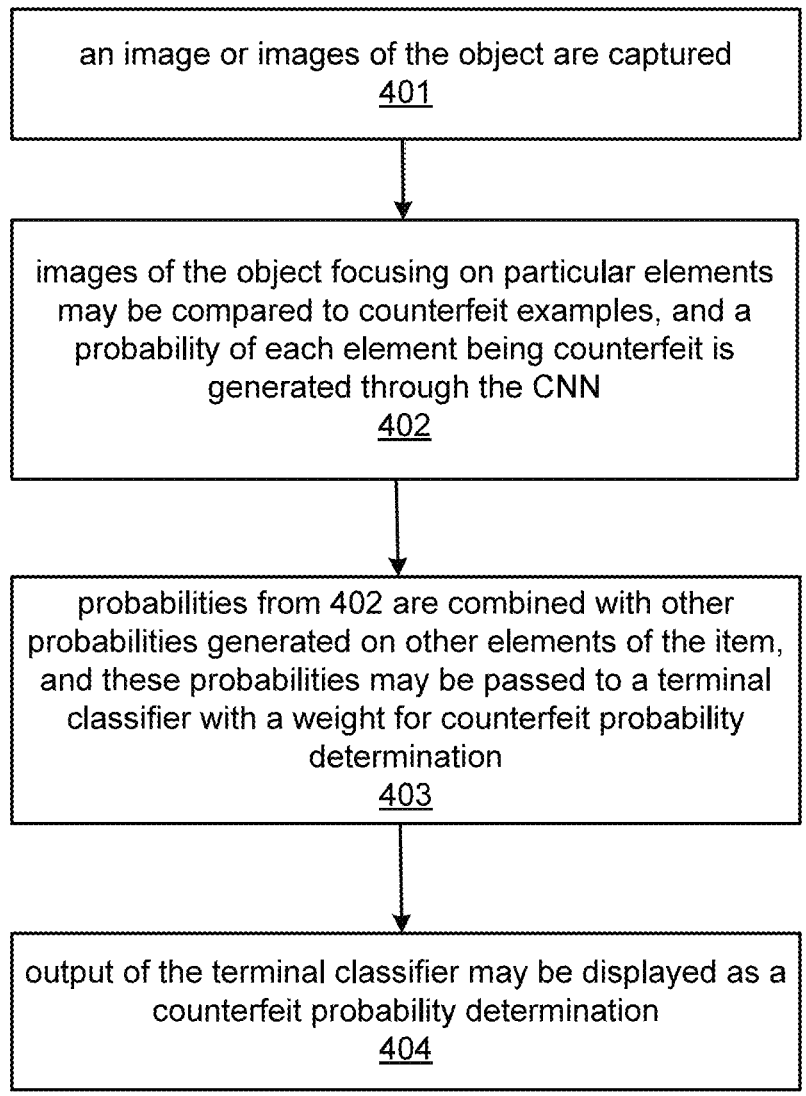

FIG. 4 shows a method 400 for counterfeit object detection. At 401, an image or images of the object 170 are captured for example by the mobile application 152. Automatic object detection may be performed initially to determine what object is in the image and if it is present in the maintained database. For example, if a pill is being queried, the initial object detection should determine that the object is a pill and suggest the most likely pills contained in the maintained database. This saves the user from guessing or determining manually which pill is being imaged.

At 402, images of the object focusing on particular elements may be compared to counterfeit examples, and a probability of each element being counterfeit is generated through the CNN 111.

At 403, the probabilities from 402 are combined with other probabilities generated on other elements of the item, and these probabilities may be passed to a terminal classifier with a weight for counterfeit probability determination.

At 404, the output of the terminal classifier may be displayed as a counterfeit probability determination.

In an example, such a situation might arise where a fashion garment is being analyzed. A close-up image of stitching, overall garment shape from multiple angles are other features, a close-up of any graphics, e.g., printed or stitched graphics, etc., may be used to generate another feature probability. To determine a probability that a garment is counterfeit, the CNN may analyze a close-up image of stitching in the garment. For example, the CNN may identify predictive features such as thread width, color, pattern, or smoothness, that may be used to determine whether an item is counterfeit. The foregoing may be learned from previous examples of known counterfeit items. From the same image, the models may find that the sewing pattern includes internal stitching to determine whether the item is counterfeit. Also, the following augmentation of images may be: rotation; translation; and brightness.

FIG. 5 illustrates the GAN subsystem 130, according to an embodiment. The GAN subsystem 130 may include a generator 502, a counterfeit images repository 504, a discriminator 506, a class activation module (CAM) 510, a predictions repository 520, and/or other components. The generator 502 may generate simulated counterfeit images 503, which may be used to train the discriminator 506. The discriminator 506, trained from the simulated counterfeit images 503 and/or actual counterfeit images 505 from the counterfeit images repository 504, may generate a discriminator output 507, which may include a prediction of whether or not an input image (whether a simulated counterfeit images 503, an actual counterfeit image 505, or test image of an actual item suspected of being a counterfeit) is a counterfeit. The discriminator output 507 may be analyzed by the CAM 510, which may generate heatmaps 511 based on the analysis. The heatmaps 511 may graphically indicate regions such as pixels of the input image that the discriminator 506 relied upon in making its prediction. Such heatmaps 511 may indicate weights applied at each convolutional layer of the discriminator 506 to generate respective convolutional layer outputs 509.

The heatmaps 511 may be provided to SMEs 513, who may be human operators that are skilled at counterfeit detection for the type of item being analyzed. For instance, the heatmaps 511 may be provided to the SMEs 513 via interactive user interfaces. The SMEs 513 may assess the heatmaps 511 and/or other data from the CAM 510 and provide annotations to the CAM 510. The annotations may indicate assessments of whether or not the heatmaps 511 accurately reflect regions that should be relied upon to predict whether the item is a counterfeit. The annotations may be provided back to the CAM 510, which provides them for retraining the discriminator 506. Thus, the discriminator 506 may be trained not only from simulated counterfeit images and/or actual counterfeit images, but also based on annotations from SMEs 513 relating to which regions of an item are important to predicting whether the item is a counterfeit. In some instances, results from training the discriminator 506 may be fed back to the generator 502. For instance, regions learned by the discriminator 506 to be important for counterfeit detection may be fed back to the generator 502 to train the generator 502 to make better simulated counterfeit images 503, which in turn may be used to better train the discriminator 506 to detect counterfeits. Having described a high-level overview of the GAN subsystem 130, attention will now turn to further details of the GAN subsystem 130 by way of examples of methods that may be performed by various components of the GAN subsystem.

Figure 6:
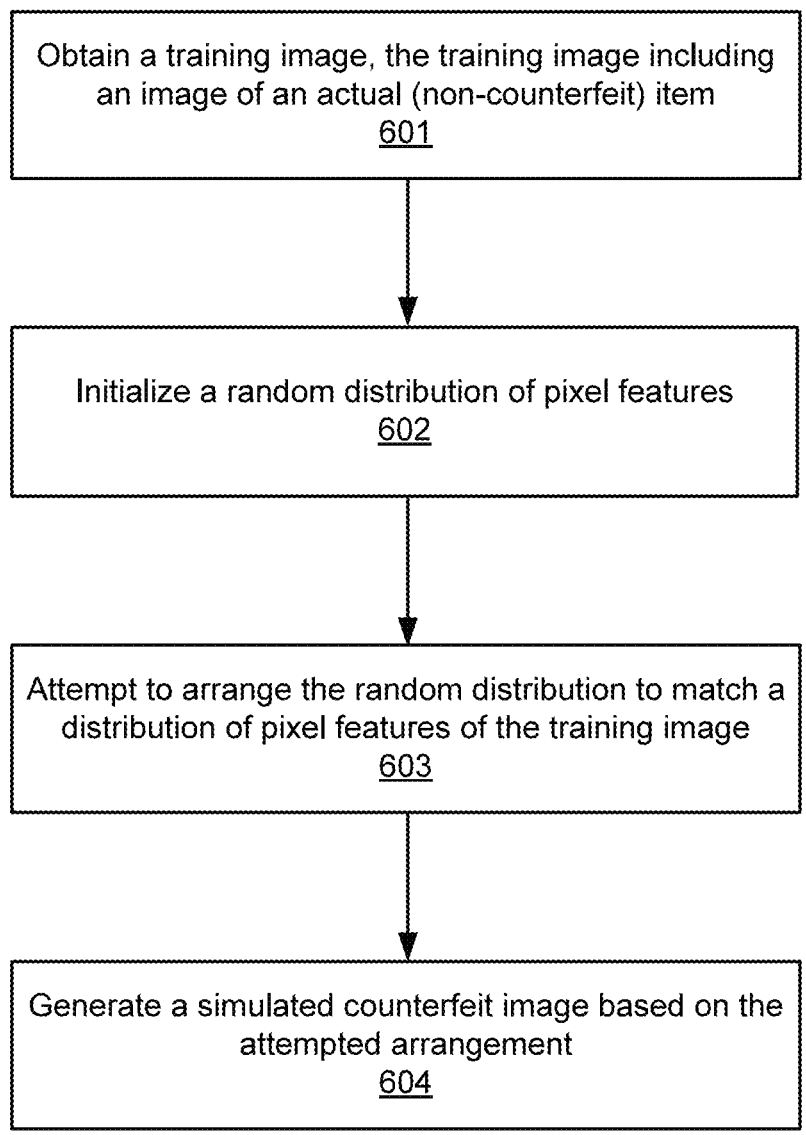
FIG. 6 illustrates a method of generating simulated counterfeit images, according to an embodiment.

Example operations of the generator 502 will be described with reference to FIG. 6, which illustrates a method of generating simulated counterfeit images, according to an embodiment. The method 600 is provided by way of example, as there may be a variety of ways to carry out the method described herein. Although the method 600 is primarily described as being performed by GAN subsystem 130 and in particular by the generator 502, the method 600 may be executed or otherwise performed by other systems, or a combination of systems. Each block shown in FIG. 6 may further represent one or more processes, methods, or subroutines, and one or more of the blocks may include machine-readable instructions stored on a non-transitory computer readable medium and executed by a processor or other type of processing circuit to perform one or more operations described herein.

At 601, the generator 502 may obtain training images 501 of an item, such as a pill or other pharmaceutical product. Although examples of counterfeit pill detection will be described, the method 600 (and GAN subsystem 130) may be used for other types of counterfeit items as well (such as apparel, currency, etc.). The training images 501 may include a sequence of images each representing a specific perspective of the item. For example, the sequence of images may be converted (such as extracted) from video taken while circling the item and/or may include multiple still images of the item taken from different angles.

At 602, the generator 502 may initialize a random distribution of pixels. For example, the random pixels may be based on random noise of a Gaussian distribution. Furthermore, an attribute of each pixel (such as color) may be randomly initialized. In some instances, tensors may be reshaped to normalize the images for image processing.

At 603, the generator 502 may attempt to arrange the random distribution to match a pixel distribution of the training image 501. Since the attempted rearrangement is unlikely to perfectly reproduce the pixels of the training image, the generator 502 may introduce a change to a training image 501. In some examples, the change may be made randomly. For example, a portion of the pixels in the training image 501 may be altered in a random way, such as by changing its position randomly and/or changing a property such as color randomly. In some instances, the pixels to be changed may be selected randomly. Alternatively or additionally, in some embodiments, the generator 502 may make changes based on input from a user and/or from the discriminator 506. For example, the user may specify certain portions of the image to be altered and/or a specific manner to alter the portions (such as changing a property such as a font of text that is imprinted on a pill). In some instances, input from the discriminator 506 may be used to alter the image. For instance, the discriminator 506 may learn (as will be described in more detail) that certain regions of an item are important for identifying counterfeits. These regions may correspond to actual parts of a genuine item that may be difficult for a counterfeiter to reproduce, may be more noticeable to SMEs 513, and/or other reasons. Whatever the reason, certain regions may be more important for identifying counterfeits than other regions. As such, with this input from the discriminator 506, the generator 502 may make changes to the training image 501 accordingly. For example, the generator 502 may focus on key regions when making a change to a training image 501, may make more subtle changes, and/or otherwise alter the way it changes the training image. In doing so, over multiple iterations, the generator 502 may generate increasingly difficult to detect counterfeit images.

At 604, the generator 502 may generate a simulated counterfeit image based on the attempted arrangement. As used herein, the term simulated counterfeit image means an image that is generated to simulate an image of a counterfeit of an item. For example, a simulated counterfeit image 503 may represent a faked version of the genuine item. Thus, simulated counterfeit images 503 are not images of actual counterfeits but rather simulated changes made an actual item to simulate how an actual counterfeit item may appear. As such, the simulated counterfeit images 503 may be used to train the discriminator 506 to detect counterfeit items.

Example operations of the discriminator 506 will now be described with reference to FIG. 7, which illustrates a method of training a discriminator with simulated and/or actual counterfeit images, according to an embodiment. The method 700 is provided by way of example, as there may be a variety of ways to carry out the method described herein. Although the method 700 is primarily described as being performed by GAN subsystem 130 and in particular by the discriminator 506, the method 700 may be executed or otherwise performed by other systems, or a combination of systems. Each block shown in FIG. 7 may further represent one or more processes, methods, or subroutines, and one or more of the blocks may include machine-readable instructions stored on a non-transitory computer readable medium and executed by a processor or other type of processing circuit to perform one or more operations described herein.

At 701, the discriminator 506 may obtain known good images of an item and identify features of the item. The known good images may include the training images 501 used by the generator 502. The identified features may be used to train the discriminator 506 to identify genuine images of the item (or at least identify each image in the training images 501 as being genuine). Each feature may correspond to a different region of the image. For example, each feature may correspond to a set of pixels that are successively analyzed in convolutional layers (such as convolution layers output 509A-N) analyzed by the discriminator 506. At the end of 701, the discriminator 506 should be able to classify each of the training images 501 as a genuine image based on the identified features, without simply comparing literal copies of the training images 501.

At 702, the discriminator 506 may obtain counterfeit images, which may include simulated counterfeit images 503 from the generator 502 and/or actual counterfeit images 505 from the counterfeit images repository 504. An actual counterfeit image 505 as used herein means an image of an actual counterfeit item that has been encountered in the real-world. For example, a counterfeit image 505 may include an image of a counterfeit pill that was found in the marketplace. In some instances, the counterfeit images 505 may include images obtained from a website offering fake (counterfeit) medicines described herein. Because actual counterfeit images 505 are images of actual counterfeits, using these images to train the discriminator 506 may be useful, but may not be available in cases where a known counterfeit of an item has not yet been detected.

At 703, the discriminator 506 may identify features (such as based on the corresponding regions) from the counterfeit images. This identification process may be similar to the identification of features described at 701.

At 704, the discriminator 506 may compare the features of the counterfeit images with the features identified from the known good images of the item. For example, the discriminator 506 may compare specific regions of an imaged item. Such regions may correspond to circularity or shape features of a pill, a partition of the pill, a specific attribute of the pill, and/or other features.

At 705, the discriminator 506 may retrain the discriminator based on the comparisons. For example, the discriminator may note, for a particular feature, differences between a counterfeit image and a genuine image. Such differences may indicate that the feature may be used to distinguish counterfeits from genuine items (non-counterfeits). As such, retraining may involve adjusting weights applied to that feature for determining the importance of that feature when making a counterfeit prediction. In some examples, if the counterfeit image is a simulated counterfeit image, the discriminator 506 may provide feedback data to the generator 502 indicating that the feature was used to identify the counterfeit so that the generator may be retrained to improve its ability to generate a more convincing counterfeit with respect to that feature.

Figure 8:
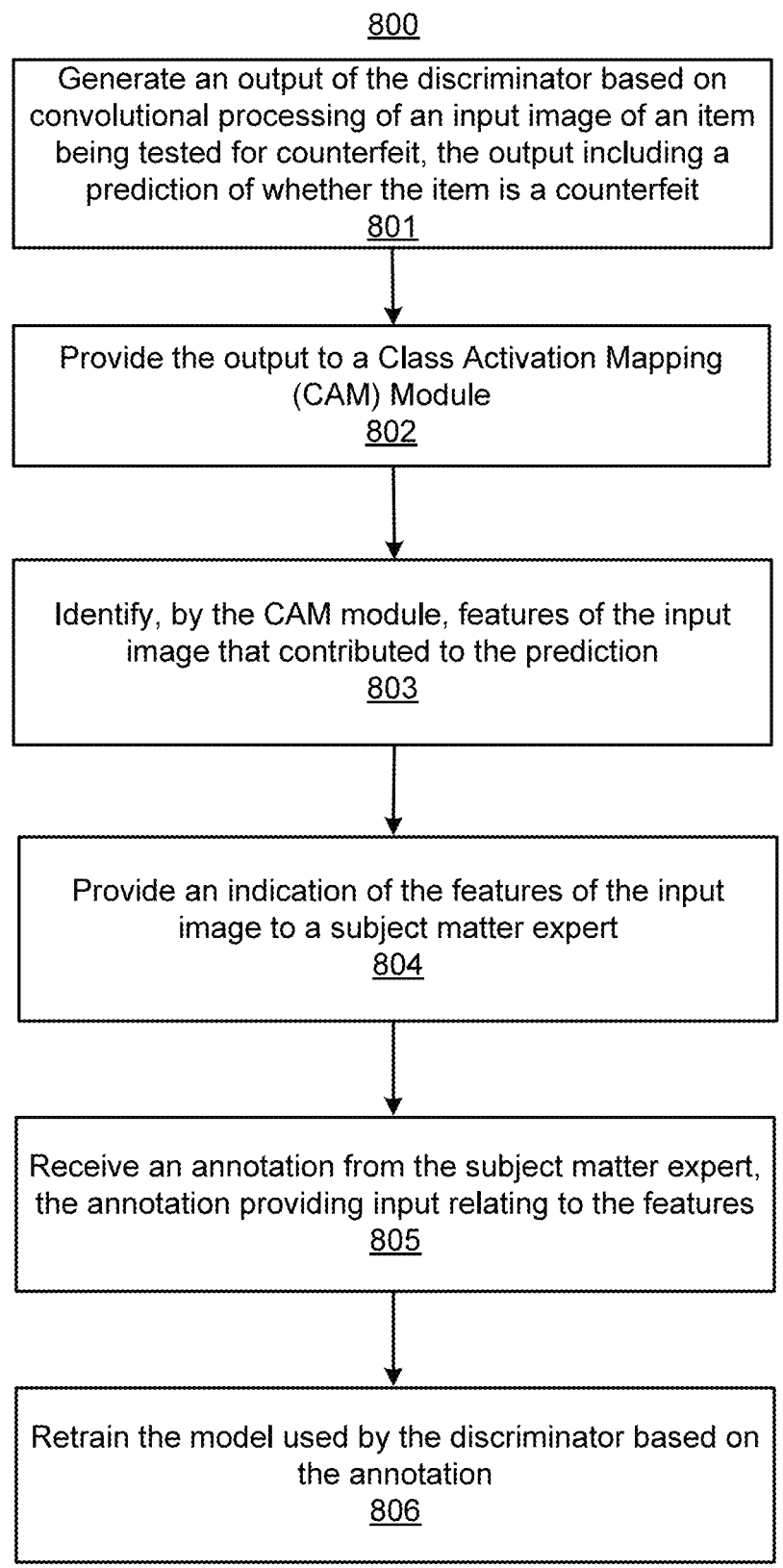
FIG. 8 illustrates a method of retraining the discriminator based on class activation mapping and annotations to the weights applied by the discriminator, according to an embodiment.

Example operations of an interaction between the discriminator 506 and CAM 510 will now be described with reference to FIG. 8, which illustrates a method of retraining the discriminator based on class activation mapping and annotations to the weights applied by the discriminator, according to an embodiment. The method 800 is provided by way of example, as there may be a variety of ways to carry out the method described herein. Although the method 800 is primarily described as being performed by GAN subsystem 130 and in particular by the discriminator 506 and CAM 510, the method 800 may be executed or otherwise performed by other systems, or a combination of systems. Each block shown in FIG. 8 may further represent one or more processes, methods, or subroutines, and one or more of the blocks may include machine-readable instructions stored on a non-transitory computer readable medium and executed by a processor or other type of processing circuit to perform one or more operations described herein.

At 801, the discriminator 506 may generate an output based on convolutional processing of an input image of an item being undergoing counterfeit analysis, the output including a prediction of whether the item is a counterfeit. For instance, referring to FIG. 5, the discriminator 506 may include a CNN employing convolutional layers output 509 (illustrated as convolutional layers output 509A-N). The processing result of the convolutional layers output 509 may be provided as discriminator output 507, which is provided as input to the CAM 510. The convolutional layers output 509 may each reflect an analysis of a respective portion of an input image. For instance, a convolutional layer may analyze and compare a region of the input image and a training image 501 (or other image of a genuine item). Another convolutional layer may analyze and compare a second region of the input image and the training image 501. Each convolutional layer may be associated with a weight that signifies the importance of the output of the convolutional layer 509. Together, the convolutional layers output 509A-N may be used to analyze the entire image (and corresponding comparison to a training image 501).

For example, the weighted output of each convolutional layer may represent that layer's prediction of whether or not the input image is a counterfeit based on the feature that the layer has analyzed (and compared to the training image 501). In particular, the weighted output may include a determination of whether a particular pixel or set of pixels of the input image indicates that the input image is an image of a counterfeit item. These weighted outputs may be combined to generate an overall prediction of whether the input image is a counterfeit. For instance, the discriminator 506 may employ global average pooling to combine the weighted outputs. Other methods of combining the weighted outputs may be used as well. Because the output from each of the convolutional layers output 509 may be weighted, each may indicate a relative importance of each feature analyzed to the overall prediction and/or may be fine-tuned to contribute more or less to the overall prediction of whether an image being analyzed is a counterfeit. This fine-tuning may be based on the training and re-training described herein, including the based on processing by the CAM 510.

At 802, the discriminator 506 may provide the discriminator output 507 to the CAM 510. The discriminator output 507 may include a prediction of whether or not the input image is a counterfeit image.

At 803, the CAM 510 may identify regions of the input image that contributed to the prediction. For example, the CAM 510 may analyze the discriminator output 507, including the convolutional layer outputs 509 and respective weights. In this way, the CAM 510 may discover the features and relative importance of those features that the discriminator 506 used to make its prediction of whether the input image is a counterfeit image.

At 804, the CAM 510 may provide an indication of the regions of the input image to a subject matter expert (such as a SME 513). For example, the CAM 510 may generate one or more heatmaps (such as heatmaps 511) of the input image. Examples of heatmaps are illustrated in FIGS. 9A-C, which show features that were correlated with whether a pill is a counterfeit pill, and FIG. 10, which illustrates an example heatmap that highlight regions of an item do not with correlate with a genuine item, according to an embodiment.

At 805, the CAM 510 may receive an annotation from the SME 513. The annotation may provide input relating to the features. For example, the annotation may include an indication that a feature deemed important to the prediction is confirmed to be important or should not have been deemed to be important. In some instances, the annotation includes a binary (yes/no) indication of the importance of the feature, or may include a scale such that the weight for that feature may be adjusted accordingly. In some examples, the annotation may include an indication of a feature that the SME 513 found to be important but that the discriminator 506 did not. As such, the weight for that feature may be prioritized (such as made higher) so that the feature impacts the prediction in subsequent analyses.

At 806, the discriminator 506 may obtain the annotations from the CAM 510 and retrain its model based on the annotation. For example, the discriminator 506 may re-adjust the weights used by the convolutional layers, thereby retraining the predictive model that classifies whether an input image is of a counterfeit or genuine item.

FIGS. 9A-9C illustrate example heatmaps that highlight regions of an item that are deemed to be important for identifying counterfeits of the item, according to an embodiment. For example, referring to FIG. 9A, a region of an image relating to a circularity feature of a pill being imaged is shown to correlate highly with predicting whether the pill is a genuine or fake. In other words, the regions highlighted in the heatmap shown in FIG. 9A correlates highly with a corresponding region of a genuine image and therefore the image is classified as that of a genuine item. In this example, the circularity of the image is correlated with a genuine item. Likewise, referring to FIG. 9B, a region of an image relating to a partition feature of a pill being imaged is shown to correlate highly with predicting whether the pill is a genuine or fake. The regions highlighted in the heatmap shown in FIG. 9B correlates highly with a corresponding region of a genuine image and therefore the image is classified as that of a genuine item. In this example, the partition shown in the image is correlated with a genuine item. In another example, referring to FIG. 9C, a region of an image relating to a specific feature of a pill being imaged is shown to correlate highly with predicting whether the pill is a genuine or fake. Again, the regions highlighted in the heatmap shown in FIG. 9C correlates highly with a corresponding region of a genuine image and therefore the image is classified as that of a genuine item. In this example, a specific region of the image is correlated with a genuine item.

FIG. 10 illustrates an example heatmap that highlight regions of an item do not with correlate with a genuine item, according to an embodiment. In this example, which shows a surface text feature of the item, there is low correlation between the image and genuine item. Thus, the image is classified as one of a faked item.

Figure 11:
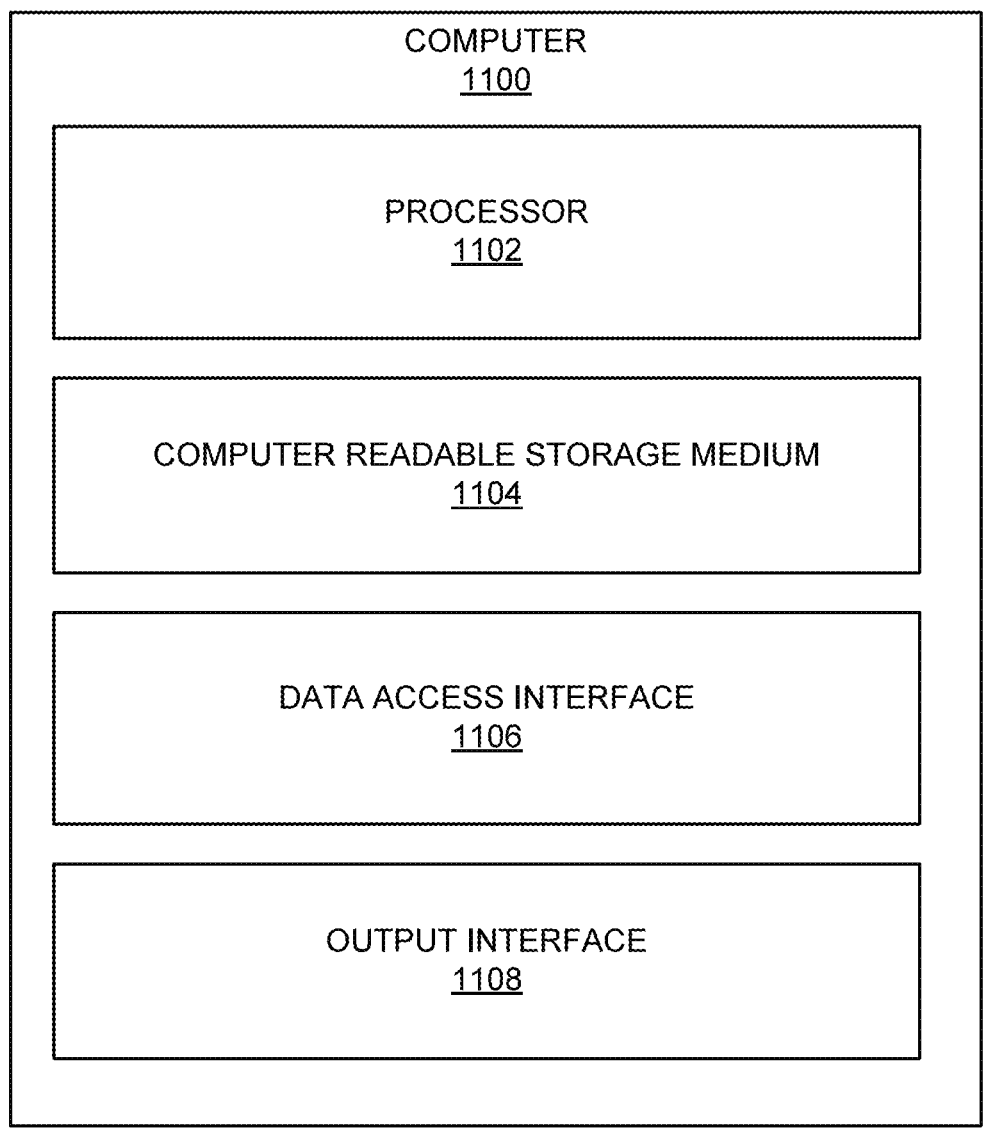
FIG. 11 illustrates a computer that may be used as a platform for one or more of the components of the counterfeit detection system, according to an embodiment.

FIG. 11 illustrates a computer 1100 that may be used as a platform for one or more of the components of the counterfeit detection system, according to an embodiment. The computer 1100 may include various layers, processors, systems or subsystems. For example, the computer 1100 may include a processor 1102, a computer readable storage medium 1104, a data access interface 1106, an output interface 1108, and/or other components. The processor 1102 may be a semiconductor-based microprocessor, a central processing unit (CPU), an application processor specific integrated circuit (ASIC), a field-programmable gate array (FPGA), and/or other suitable hardware device. Although the computer 1100 has been depicted as including a single processor 1102, it should be understood that the computer 1100 may include multiple processors, multiple cores, or the like, without departing from the scopes of the computer 1100 disclosed herein.

The computer readable storage medium 1104 may have stored thereon machine-readable instructions (which may also be termed computer readable instructions) that the processor 1102 may execute. The computer readable storage medium 1104 may be an electronic, magnetic, optical, or other physical storage device that includes or stores executable instructions. The memory 110 may be, for example, Random Access memory (RAM), an Electrically Erasable Programmable Read-Only Memory (EEPROM), a storage device, an optical disc, and the like. The computer readable storage medium 1104 may be a non-transitory machine-readable storage medium, where the term "non-transitory" does not encompass transitory propagating signals.

The data access interface 1106 and output interface 1108 may be any number of hardware, network, or software interfaces that serves to facilitate communication and exchange of data between any number of or combination of equipment, protocol layers, or applications. For example, the data access interface 1106 and output interface 1108 may each include a network interface to communicate with other servers, devices, components or network elements via a network in the counterfeit detection system 100.

Embodiments and examples are described above, and those skilled in the art will be able to make various modifications to the described embodiments and examples without departing from the scope of the embodiments and examples.

What is claimed is:

1. A counterfeit detection system, comprising:
one or more data stores to store an image of a genuine item;
a processor that executes instructions to:
obtain an input image;
determine, by a discriminator of a generative adversarial network (GAN), a difference between a region of the image of the genuine item and a corresponding region of the input image;
generate, by the discriminator, a classification of whether the input image includes the genuine item based on the determined difference;
identify, by a class activation module (CAM), the corresponding region of the input image that contributed to the classification;
obtain, by the CAM, an annotation that indicates whether or not the corresponding region is indicative of whether the input image includes the genuine item; and
retrain the discriminator and/or the CAM based on the annotation.

2. The counterfeit detection system of claim 1, wherein the processor is further to:
generate a heatmap that indicates the corresponding region of the input image that was used to generate the classification; and
provide the heatmap via an interactive interface, wherein the annotation is obtained from a user via the interactive interface.

3. The counterfeit detection system of claim 1, wherein to generate the classification, the processor is further to:
generate a weighted output for the corresponding region based on a weight indicative of the importance of the corresponding region in the classification generation; and
update the weight based on the annotation.

4. The counterfeit detection system of claim 3, wherein the processor is further to:
determine, by the discriminator, a second difference between a second region of the image of the genuine item and a second corresponding region of the input image,
wherein the classification is based further on the second difference.

5. The counterfeit detection system of claim 4, wherein the processor is further to:
generate, by a first convolutional layer of the discriminator, a first convolutional layer output that indicates whether the corresponding region of the input image includes a first portion of the genuine item; and
generate, by a second convolutional layer of the discriminator, a second convolutional layer output that indicates whether the second corresponding region of the input image includes a second portion of the genuine item,
wherein the classification is based on the first convolutional layer output, the second convolutional layer output, or both the first convolutional layer output and the second convolutional layer output.

6. The counterfeit detection system of claim 5, wherein the processor is further to:
obtain, by the CAM, a first weight applied by the discriminator to generate the first convolutional layer output and a second weight applied by the discriminator to generate the second convolutional layer output;
identify at least one of the first convolutional layer output, the second convolutional layer output, or both the first convolutional layer output and the second convolutional layer output were relied upon by the discriminator in making the classification; and
provide a graphical output to a subject matter expert indicative of:
the corresponding region if the first convolutional layer output was relied upon, the corresponding region if the second convolutional layer output was relied upon, or both the region and the second corresponding region if both the first convolutional layer output and the second convolutional layer output were relied upon; and receive, from the subject matter expert, an annotation relating to the graphical output.

7. The counterfeit detection system of claim 6, wherein the graphical output includes an indication of a corresponding weight for a region that was relied upon by the discriminator in making the classification, and the annotation includes an adjustment to the weight, wherein the processor is further to:

provide the adjustment of the weight to the discriminator.

8. The counterfeit detection system of claim 6, wherein the annotation includes an identification of a new region not relied upon by the discriminator to make the classification but determined to correlate with identifying faked items, and wherein the processor is further to:

provide the identification of the new region to the discriminator, wherein the discriminator uses the new region to make future classifications.

9. The counterfeit detection system of claim 1, wherein the processor is further to:

provide, by the discriminator to a generator, an indication that the difference between the region of the image of the genuine item and the corresponding region was detected by the discriminator; and train the generator based on the indication that the difference between the image of the genuine item and the corresponding region was detected by the discriminator.

10. The counterfeit detection system of claim 1, wherein the processor is further to:

obtain an actual counterfeit image of an actual fake of the genuine item; and train the discriminator to identify a third region of the image of the genuine item that is different than a third corresponding region of the actual counterfeit image.

11. The counterfeit detection system of claim 1, wherein the processor is further to:

generate, by a generator of the GAN implemented by the processor, a simulated counterfeit image representing a faked version of the genuine item; and train the discriminator of the GAN to identify a region of the image of the genuine item that is different than a corresponding region of the simulated counterfeit image.

12. The counterfeit detection system of claim 1, wherein to obtain the input image, the processor is further to:

receive video data of an item; and extract a plurality of images from the video data, wherein the input image comprises the plurality of images.

13. A method of detecting counterfeits, comprising:

obtaining, by a processor, an input image;

determining, by a discriminator of a generative adversarial network (GAN) implemented by the processor, a difference between a region of an image of a genuine item and a corresponding region of the input image;

generating, by the discriminator, a classification of whether the input image includes the genuine item based on the determined difference;

identifying, by a class activation module (CAM) of the GAN, the corresponding region of the input image that contributed to the classification;

obtaining, by the CAM, an annotation that indicates whether or not the corresponding region is indicative of whether the input image includes the genuine item; and retraining, by the processor, the discriminator and/or the CAM based on the annotation.

14. The method of claim 13, further comprising:

generating a heatmap that indicates the corresponding region of the input image that was used to generate the classification; and providing the heatmap via an interactive interface to a subject matter expert, wherein the annotation is obtained from the subject matter expert via the interactive interface.

15. The method of claim 13, wherein generating the classification comprises:

generating a weighted output for the corresponding region based on a weight indicative of the importance of the corresponding region in the classification generation; and updating the weight based on the annotation.

16. The method of claim 15, further comprising:

determining, by the discriminator, a second difference between a second region of the image of the genuine item and a second corresponding region of the input image, wherein the classification is based further on the second difference.

17. The method of claim 16, further comprising:

generating, by a first convolutional layer of the discriminator, a first convolutional layer output that indicates whether the corresponding region of the input image includes a first portion of the genuine item; and generating, by a second convolutional layer of the discriminator, a second convolutional layer output that indicates whether the second corresponding region of the input image includes a second portion of the genuine item, wherein the classification is based on the first convolutional layer output, the second convolutional layer output, or both the first convolutional layer output and the second convolutional layer output.

18. The method of claim 17, further comprising:

obtaining, by the CAM, a first weight applied by the discriminator to generate the first convolutional layer output and a second weight applied by the discriminator to generate the second convolutional layer output;

identifying at least one of the first convolutional layer output, the second convolutional layer output, or both the first convolutional layer output and the second convolutional layer output were relied upon by the discriminator in making the classification; and providing a graphical output to a subject matter expert indicative of:

the corresponding region if the first convolutional layer output was relied upon, the corresponding region if the second convolutional layer output was relied upon, or both the region and the second corresponding region if both the first convolutional layer output and the second convolutional layer output were relied upon; and receiving, from the subject matter expert, an annotation relating to the graphical output.

19. The method of claim 18, wherein the graphical output includes an indication of a corresponding weight for a region that was relied upon by the discriminator in making the classification, and the annotation includes an adjustment to the weight, the method further comprising:

providing the adjustment of the weight to the discriminator.

20. The method of claim 18, wherein the annotation includes an identification of a new region not relied upon by the discriminator to make the classification but determined to correlate with identifying faked items, the method further comprising:

provided the identification of the new region to the discriminator, wherein the discriminator uses the new region to make future classifications.

21. The method of claim 20, further comprising:

training a generator of the GAN based on an indication from the discriminator that the difference between the region of the image of the genuine item and the corresponding region was detected by the discriminator.

22. The method of claim 13, further comprising:

obtaining an actual counterfeit image of an actual fake of the genuine item; and training the discriminator to identify a third region of the image of the genuine item that is different than a third corresponding region of the actual counterfeit image.

23. A non-transitory computer-readable medium comprising machine readable instructions that when executed by a processor of a computer, cause the processor to:

obtain an input image;

determine, by a discriminator of a generative adversarial network (GAN) implemented by the processor, a difference between a region of an image of a genuine item and a corresponding region of the input image;

generate, by the discriminator, a plurality of convolutional layer outputs that are each based on a respective weight, wherein each layer analyzes a respective input relating to the input image;

combine, by the discriminator, the plurality of convolutional layer outputs to generate a classification of whether the input image includes the genuine item based on the determined difference;

obtain, by a class activation module (CAM) from a user, an adjustment to at least a first weight; and adjust, by the processor, the first weight based on the adjustment.

* * * * *